United States Patent
Hadad et al.

(10) Patent No.: US 8,254,281 B2
(45) Date of Patent: Aug. 28, 2012

(54) METHOD FOR DOPPLER SHIFT ESTIMATION AND COMPENSATION IN A COMMUNICATIONS SYSTEM

(76) Inventors: Zion Hadad, Petah Tikva (IL); Doron Ezri, Petah Tikva (IL); Ofer Shalem, Petah Tikva (IL); Michael Erlihson, Petah Tivka (IL)

(*) Notice: Subject to any disclaimer, the term of this patent is extended or adjusted under 35 U.S.C. 154(b) by 0 days.

(21) Appl. No.: 12/526,948

(22) PCT Filed: Feb. 18, 2008

(86) PCT No.: PCT/IL2008/000208
§ 371 (c)(1),
(2), (4) Date: Aug. 3, 2010

(87) PCT Pub. No.: WO2008/099410
PCT Pub. Date: Aug. 21, 2008

(65) Prior Publication Data
US 2010/0290356 A1    Nov. 18, 2010

(30) Foreign Application Priority Data
Feb. 18, 2007  (IL) .......................... 181400

(51) Int. Cl.
*H04J 1/16* (2006.01)
(52) U.S. Cl. ............................ 370/252; 370/338; 455/75
(58) Field of Classification Search .................. 370/252, 370/316, 317, 328, 329, 338; 455/62, 63.3, 455/67.11, 71, 75, 427
See application file for complete search history.

(56) References Cited

U.S. PATENT DOCUMENTS

| | | | |
|---|---|---|---|
| 7,579,983 B2* | 8/2009 | Matsumoto | 342/357.62 |
| 7,787,358 B2* | 8/2010 | Wilhelmsson et al. | 370/208 |
| 2008/0075056 A1* | 3/2008 | Thome | 370/342 |
| 2009/0279476 A1* | 11/2009 | Li et al. | 370/328 |

* cited by examiner

*Primary Examiner* — Ricky Ngo
*Assistant Examiner* — Kan Yuen
(74) *Attorney, Agent, or Firm* — Smith Risley Tempel Santos LLC; Gregory Scott Smith

(57) ABSTRACT

A communications system comprising at least one Base Station BS, one or more Satellites and Mobile Stations MS connected therebetween, and wherein the mobile station includes means to calculate Doppler frequency shifts. In a preferred embodiment, the mobile station includes means to measure clock mismatch frequency.

6 Claims, 5 Drawing Sheets

STD of the Doppler estimation error vs. SNR for several numbers of used UL

First UL allocation composed of pilots subcarriers

METHOD FOR DOPPLER SHIFT ESTIMATION AND COMPENSATION IN A COMMUNICATIONS SYSTEM

CROSS REFERENCE TO RELATED APPLICATIONS

This United States non-provisional application for patent is a national application being filed under 35 U.S.C. 371 and claiming the benefit of and priority to Israeli application serial number 181400 filed on 18 Feb. 2007, through the Patent Cooperation Treaty Filing having an international publication number of WO2008/099410 (PCT/IL2008/000208) and having an international filing date of 18 Feb. 2008.

The present application claims priority from the patent application No. 181400 filed in Israel on 18 Feb. 2007 by the same applicant and having the same title.

This invention related to communication improvement system and method and more specifically to Doppler correction.

BACKGROUND OF THE INVENTION

In communication systems, wherein a Mobile Subscriber MS is on the move, the frequency varies according to Doppler effect, as it communicates with a Base Station BS.

It is desired to estimate and correct the Doppler effect, and other effects as well which result in frequency error—and reduce communications systems performance.

In many communication protocols, such as 802.16e or WiMAX, there are several frequency carriers and/or subcarriers, at some frequencies and distanced apart.

In S-WiMAX and some other communication protocols and systems, the carrier spacing may be reduced, such as about 2 KHz. In such cases the expected Doppler shift (e.g. 200 Hz) might be too large to be left uncompensated and may affect performance, thus it may be required to compensate for this effect. Doppler shifts may be compensated at the MS and/or at the BS.

SUMMARY OF THE INVENTION

According to the new invention, it may be possible to further distinguish different factors of frequency variation. Thus, the effect of some of these factors may be reduced, if taken into account as separate factors.

This new invention may be implemented using standard existing hardware means, such as by updating the MS and/or BS software.

This invention may provide means to better estimate and correct the Doppler effect, and perform such estimates over time Frequency errors caused by other effects may be reduced as well—and the overall frequency error, both in BS and MS, may be reduced—allowing better usage of the spectrum, and less interference between adjacent carriers and/or sub carriers and/or frequencies.

Thus, setting a more precise frequency, using corrections in transmitting and/or receiving, at the BS and/or at the MS, may improve communications.

This may be more important in S-WiMAX, WiMAX systems with satellite communications, or similar systems or protocols.

Since in S-WiMAX the carrier spacing may be small, such as about 2 KHz, it may become important to reduce an expected 200 Hz Doppler shift, thus reducing interferes to other adjacent signals and/or data, reducing noise and improving communications speed, and decreasing BER.

According to the new invention, Doppler shifts may be compensated at the MS and/or at the BS, while taking into account additional factors.

DETAILED DESCRIPTION OF THE PREFERRED EMBODIMENTS

The present invention will be described by way of example, and with reference to the accompanying drawings.

Figure 1:
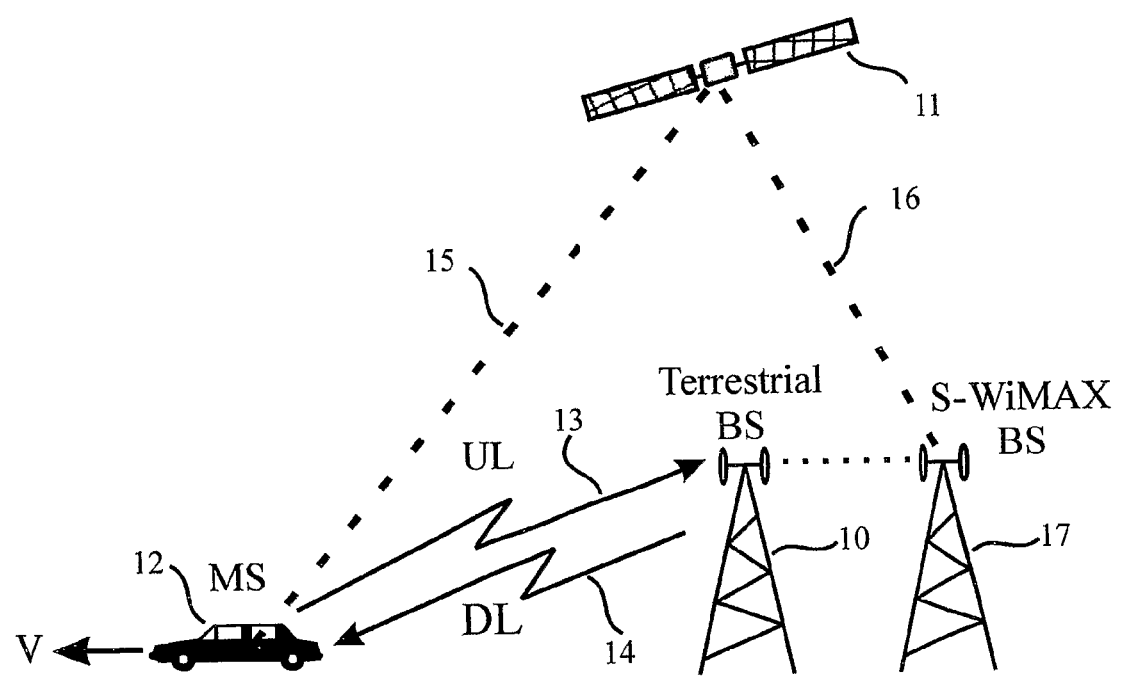
FIG. 1 illustrates a communications system comprising BS's, MS's and a Satellite FIG. 2 details typical frequency spacing of WiMAX and S-WiMAX systems FIG. 3 details a method for Doppler shift and clock mismatch estimation and compensation FIG. 4 details simulation results for one or more UL pilot subframes used.

FIG. 1 illustrates a communications system comprising one or more terrestrial 10 and/or S-WiMAX 17 Base Stations BS's, Mobile Stations MS's 12, and optionally one or more Satellites 11, As a MS moves in a velocity V, Doppler frequency shifts may occur in the Up Link UL 13 from the MS to the BS, and in the Down Link DL 14, from the BS to the MS.

Communications 15 between the MS 12 and the satellite 11, and/or communications 16 between the BS 17 and the satellite 11, may be initiated as well.

In a preferred embodiment, compensation is implemented at the MS, in order to synchronize on the received DL carrier frequency. Once such synchronization is achieved at the MS, UL transmission may be performed with identical frequency compensation. By communicating between the MS and BS, using Pilots and/or other signals at the UL and DL, it is possible to distinguish the clock mismatch from the Doppler shift, since the Doppler shift is likewise for both directions of communications. Measurements and estimations may be performed by hardware means, wherein data is provided to the communication system—or is used in such a manner to correct transmitted and/or received frequencies accordingly.

Figure 2:
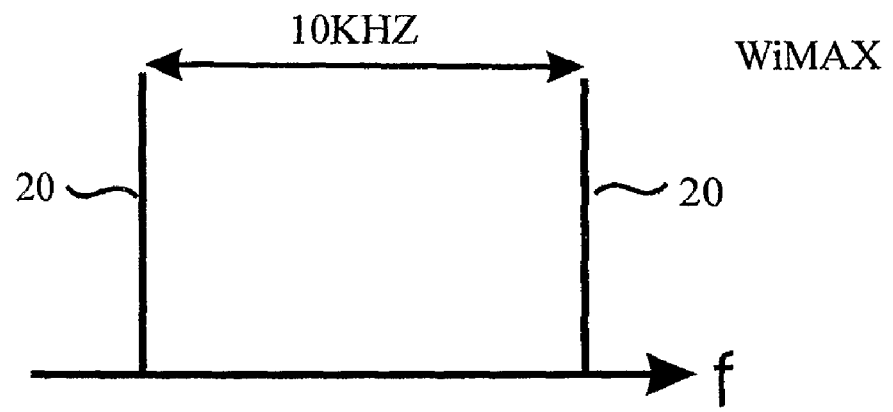
Figure 2:
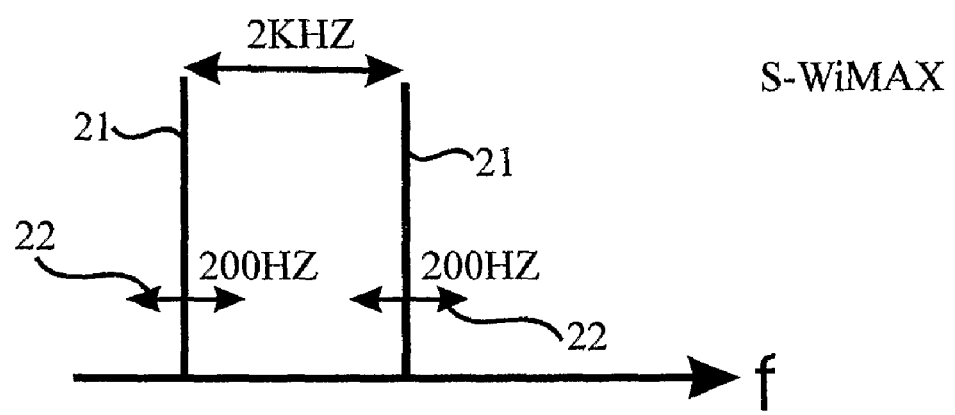

FIG. 2 details a typical frequency spacing of WiMAX and S-WiMAX systems. In WiMAX, as described in FIG. 2, when a 10 KHz carrier-spacing between carriers and/or sub-carriers 20 is used, Doppler shifts may have smaller effect.

In case smaller carrier-spacing between carriers and/or sub-carriers 21 is used, such as when a 2 KHz carrier-spacing is used, Doppler shifts may affect performance, such as may be the case in S-WiMAX wherein smaller carrier-spacing approximately 2 KHz may be more vulnerable to the expected 200 Hz Doppler shift 22, and relevant signals should be frequency compensated.

Figure 3:
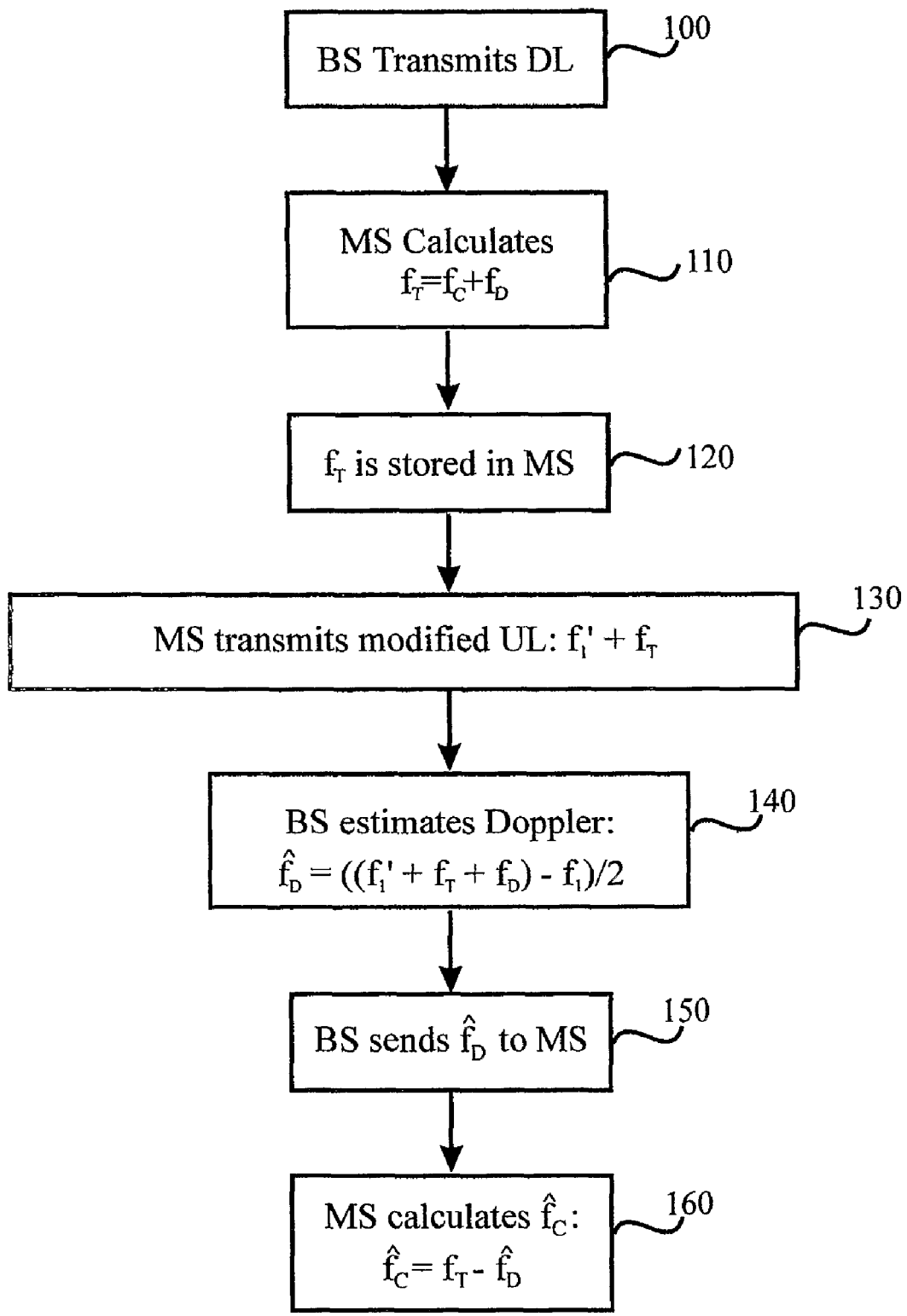

FIG. 3 details a method for Doppler shift estimation and compensation. The method may include the following steps:
1. A BS may transmit in DL, a special signal or one or more pilot signals or a mixed signal comprised of any of the above mentioned, to a MS, and may be in a number of time frames. This may be done similarly to standard frequency synchronization in WiMAX. This step 100 may provide initial signal for synchronization.
2. The MS receives one or more signals transmitted by the BS 100. In this calculation stage 110, one or more compensation frequencies are found.

A compensation frequency $f_T$, may be a sum of clocks mismatch frequency $f_C$, and a Doppler shift, $f_D$. Thus $f_T = f_C + f_D$.

The clock mismatch frequency may originate from frequency differences between the BS and the MS.

In case the BS transmits at a frequency $f_1$ and the MS uses a frequency $f_1'$ then $f_C = f_1 - f_1'$. As a result, the compensation frequency is:

$f_T = f_1 - f_1' + f_D = f_C + f_D$. Thus, the initially calculated compensation frequency $f_T$ may be different from the Doppler frequency shift $f_D$.

3. In this step 120, The frequency compensation, $f_T$, is stored in the MS memory or in any hardware means. Several compensation frequencies $f_T$ may be kept over time, as well. In addition, any equivalent data indicative of this measurement may be kept, as well.

In step 130, one or more UL transmissions are made, preferably they may be composed of pilots only. The more pilots used in this UL transmission, the more accurate the Doppler estimation by the BS due to the increase in processing gain.

4. In step 140, the BS receives the transmission of the MS and estimates the Doppler frequency $\hat{f}_D$.

For a signal transmitted by the MS at step 130 in a frequency of $f_1' + f_T = f_1 + f_D$. The received signal at the BS is about the frequency $f_1 + 2 f_D$, Thus $\hat{f}_D$ may be calculated by subtracting the BS frequency f1 from the received signal:

$$\hat{f}_D = \frac{1}{2} * (f_1 + 2f_D - f_1).$$

5. In step 150, the BS transmits $\hat{f}_D$ or equivalent data to the MS. This may be combined within a regular DL subframe.

6. Step 160 is implemented as the MS for calculating $\hat{f}_C$, which is an estimation of $f_C$. Using the known estimate, $\hat{f}_D$, of the Doppler shift, which was obtained from the BS. The MS uses $\hat{f}_D$ to estimate the clock mismatch, $f_C$, assumed constant or slowly-varying and wherein $f_T$ is already known, such as from step 120, by:

$$\hat{f}_C = \hat{f}_T - \hat{f}_D.$$

This method or any parts of it can be repeated, such as at the i-th UL subframe, where the MS applies an updated Doppler compensation, $\hat{f}_D(i)$, which satisfies $\hat{f}_D(i) = f_T(i-1) - \hat{f}_C$. This compensation may offer improved frequency compensation abilities, such as by obtaining $f_T(i-1)$ from the previous DL subframe.

Preferably, this method involves both the MS and the BS, allowing the estimation of the Doppler shift and its compensation at the MS. Constant updates and estimations may be implemented as part of regular DL and UL transmissions between the BS and the MS, both for measuring the received signals and for providing indicative data.

In a preferred embodiment, mismatch estimation is performed once in about 50 frames, for estimations updates. The period may be determined by the bandwidth of the clock-mismatch process.

It may be possible to perform an equivalent and/or similar method for improved Doppler estimations by using different calculations at the BS and/or MS, by making different transmissions, or by sending different parameters.

Figure 5:
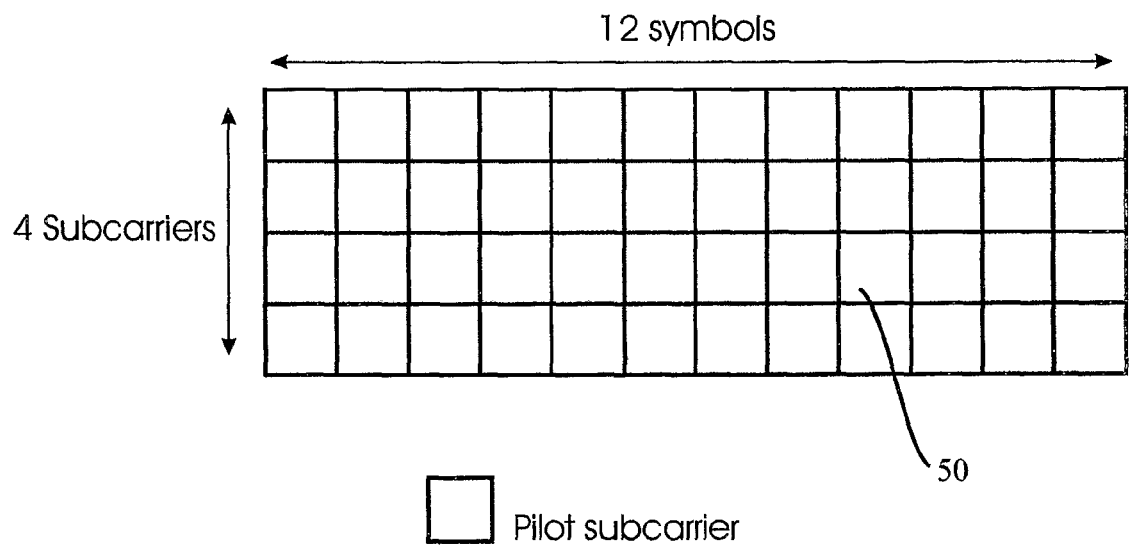
FIG. 5 details a typical allocation of pilots in a communication system

FIG. 5 details a typical allocation of pilot subscribers 50 in a communication system. In a preferred embodiment, 4 sub carriers versus 12 symbols are used, as detailed in the figure.

As a system and/or method are used, upon initiating compensation approach, the MS may not be able to distinguish between the two mentioned components of $\hat{f}_T$: $f_C$ and $f_D$.

Thus, it may be possible to perform a frequency compensation for the UL, such as may be used in the WiMAX standard. At the first transmission it may be possible to estimate the Doppler shift experienced at the BS during the UL. Since the number of pilots in regular S-WiMAX UL transmission may imply low processing gain and poor performance, hence inaccurate Doppler shift estimation, the first UL transmission can be composed solely of pilot sub carriers, such as detailed in FIG. 5.

Figure 4:
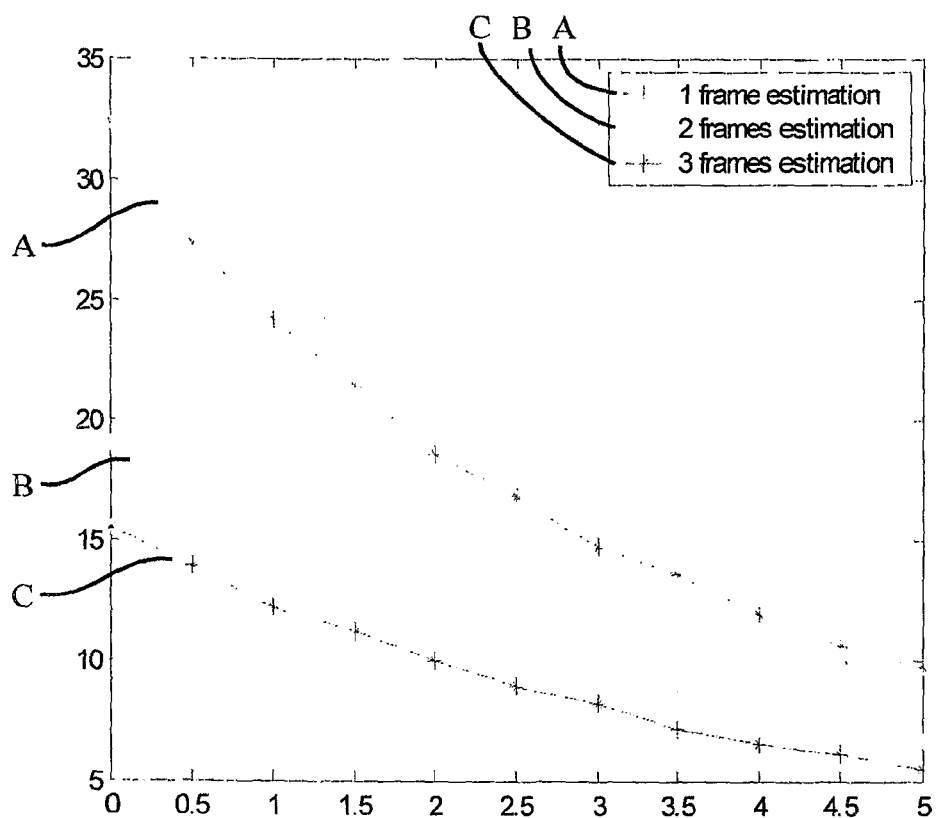

FIG. 4 details simulation results for one or more UL pilot subframes used.

A method, based on the simulation results includes the following steps:

a. DL transmission by the BS.

b. Reception of the DL by the MS with Doppler frequency shift, typically about 200 Hz.

c. The MS synchronizes based on the DL, by locking on the carrier frequency shifted by the assumed Doppler value.

d. UL transmission of solely pilots subframe that arrives at the BS with carrier frequency shifted by two assumed Doppler values.

e. Frequency shift by two assumed Doppler values estimation at the BS based on the pilots UL subframe/frames.

The figure details possible results for the Doppler estimation error at the BS.

In some embodiments, as demonstrated in the simulation, it is possible to use one or more pilots UL subframes.

The results are given in terms of standard-deviation (STD) of the Doppler estimation method at the BS.

The STD may decrease with the SNR and with the number of aggregated UL subframes at hand.

Thus, the STD of the Doppler estimation error, such as with SNR of 1 dB and a single UL subframe, can be smaller than 25 Hz, which in this example is one percent of the carrier spacing. This may be sufficient for valid decoding of the UL signals.

In some embodiments, possible changes to the 802.16e Standard may be made, in order to implement the UL Doppler correction mechanism:

a. Inclusion of the first pilot only UL transmission, such as described with reference to FIG. 5.

b. Inclusion of the DL Doppler shift message, such as described with reference to FIG. 3.

In case of Hand-Off HO from the Terrestrial BS, a novel method may be used similarly to the method of FIG. 3.

In case of HO from a terrestrial WiMAX BS to a satellite linked BS, the method's steps may be altered using the following steps, or in a combination thereof:

1. In order to eliminate the need for a pilots UL transmission, the estimate of the clock mismatch can be achieved using a closed-loop operation with the terrestrial WiMAX BS, in a manner similar to that described with reference to FIG. 3.

2. Closed-loop frequency corrections with the terrestrial BS may be done within what is known as the Ranging process in WiMAX.

3. The MS or User Terminal UT can estimate the clock mismatch with the terrestrial BS, which can approximate the clock mismatch with the satellite linked BS.

4. The subsequent steps of the method described in FIG. 3 may remain unchanged. Thus, it may be possible to maintain the continuous estimation of the Doppler shift using the DL signal and its compensation during the UL.

It will be recognized that the foregoing is but one example of a system and method within the scope of the present invention, and that various modifications will occur to those skilled in the art upon reading the disclosure set forth hereinbefore.

The invention claimed is:

1. A method for Doppler shift estimation and compensation in a communications system comprising a base station (BS) and a mobile station (MS), the method comprising the steps:
   (a) transmitting by the BS one or more downlink (DL) signals with one or more pilots signals to the MS;
   (b) receiving said one or more DL signals by the MS and calculating or measuring a compensation frequency $f_T$;
   (c) storing the compensation frequency $f_T$ into a memory element;
   (d) transmitting one or more uplink (UL) signals, with one or more pilots;
   (e) receiving said one or more UL signals and estimating a Doppler shift $f_D$;
   (f) transmitting $f_D$ descriptive data by the BS to the MS; and
   (g) calculating at the MS an estimation of clock mismatch $f_C$ using the stored compensation frequency $f_T$ and the estimated Doppler shift $f_D$ according to the formula $f_C = f_T - f_D$.

2. The method according to claim 1, wherein using standard communications and coordination between the BS and the MS, calculations and notifications of clock mismatch frequencies are initiated.

3. The method according to claim 1, wherein using standard communications and coordination between the BS and the MS, calculations and notifications of Doppler frequency shifts are initiated.

4. The method according to claim 3, wherein using standard communications and coordination between the BS and the MS, calculations and notifications of clock mismatch frequencies are initiated.

5. The method according to claim 1, wherein the MS is a User Terminal.

6. The method according to claim 1, wherein the communications system further comprises at least one satellite.

* * * * *